United States Patent Office 2,994,140
Patented Aug. 1, 1961

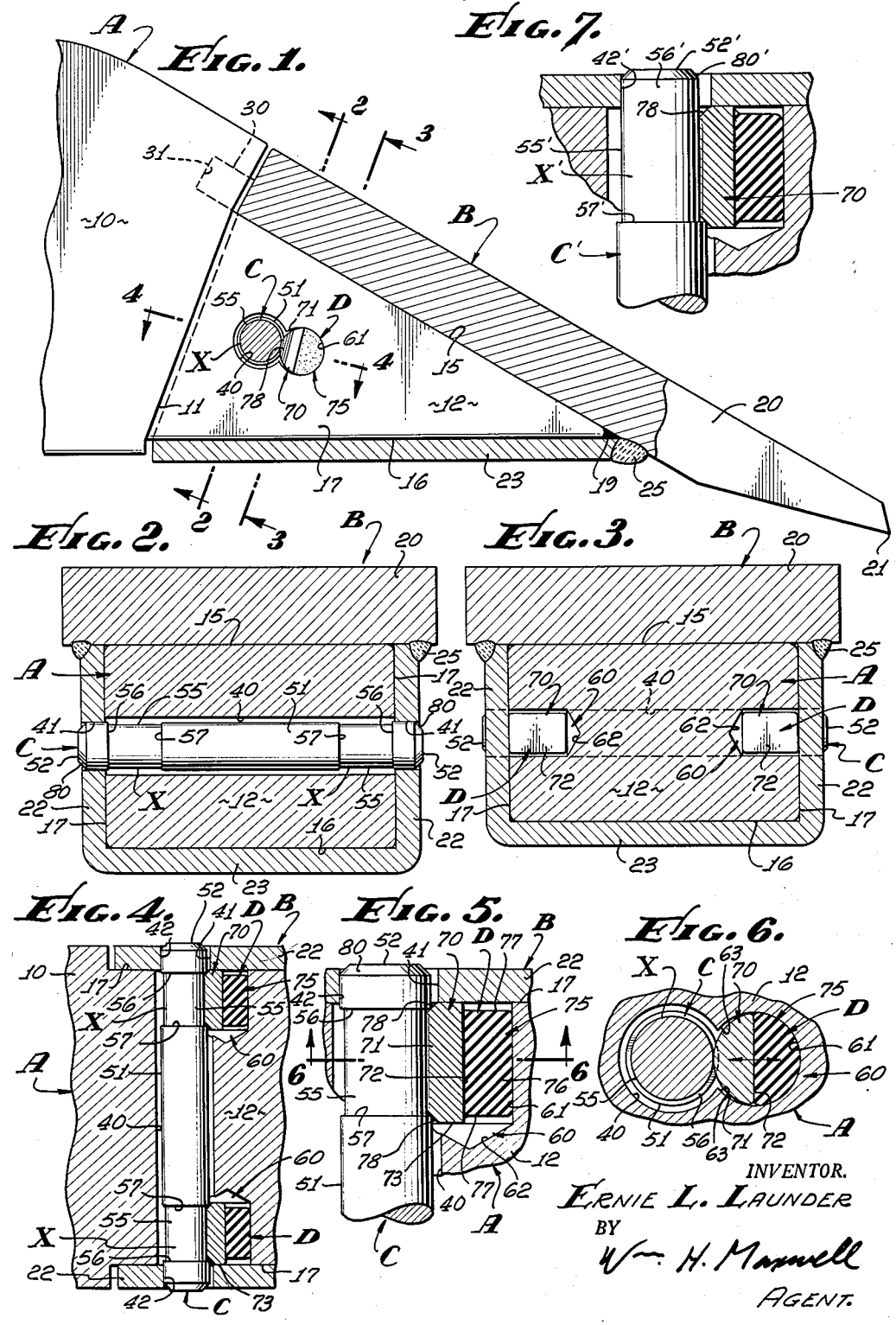

2,994,140
POINT LOCKING MECHANISM FOR DIGGER TEETH
Ernie L. Launder, Montebello, Calif., assignor to H. & L. Tooth Company, Montebello, Calif., a corporation of California
Filed May 14, 1956, Ser. No. 584,661
8 Claims. (Cl. 37—142)

This invention has to do with a point locking mechanism for digger teeth, and in particular with removable tooth points that are locked onto adapters of earth handling equipment and the like. A general object of this invention is to provide a mechanism for securing a tooth point to a tooth adapter that is simple, practical, and dependable and that is such as to allow for easy replacement of the tooth point when it is worn.

Reference is made to my Patent No. 2,568,075, entitled Cap Fastener for Excavating Bucket Digging Teeth, issued September 18, 1951.

An object of this invention is to provide a pin type locking mechanism in which a simple pin is yieldingly urged in a direction to secure two relatively movable parts in tight engagement with each other. In the mechanism of the present invention, the pin is a simple straight elongate turned element and there is provided, one or more pressure exterting lock units adapted to yieldingly urge the pin in a direction to hold a tooth point in seating engagement with the nose of a tooth or an adapter. The pressure exterting and lock units that I provide include a block and means that operates against the block to urge it into pressure locking engagement with the pin. The said means is preferably a resilient means formed of rubber or the like and is held to the block as by vulcanizing. As shown, there are two pressure exerting lock units, one at each side of the tooth or adapter, and carried in recesses therein. The pressure exerting lock units engage the pin in a manner to releasably hold it in working position whereby the relatively movable parts are secured against separation.

It is an object of this invention to provide a mechanism in which a retaining pin is locked in working position to hold two relatively movable parts against separation. In the structure that I provide, there are shoulders on the pin that are engaged by the pressure exerting lock units above referred to, to the end that the pin will not be displaced longitudinally from its working position under normal operating conditions. Only by the application of extreme force that is specially applied can the pin be removed from working position.

It is still another object of this invention to provide means for facilitating entry of the pin into working position. The pressure exerting lock units are formed so that the pin is easily entered into working position while it is still effective to lock the pin in said working position.

Still further, it is an object of this invention to provide a point locking structure of the character referred to that excludes dirt and material from between the working parts thereof. In the structure provided, there are but small interstices between the parts and the lock units act as closures in order to prevent entry of dirt between the parts.

An object of this invention is to provide a locking mechanism of the type under consideration in which there are simple inexpensive pressure exerting locking units. The locking units are alike and are rugged and dependable and easy to install.

The various objects and features of my invention will be fully understood from the following detailed description of typical preferred forms and applications of my invention, throughout which description reference is made to the accompanying drawings, in which:

FIG. 1 is a side view of a structure embodying the features of the present invention and illustrating portions thereof broken away to show in section. FIGS. 2 and 3 are detailed transverse sectional views taken as indicated by lines 2—2 and 3—3 on FIG. 1, respectively. FIG. 4 is a detailed sectional view taken as indicated by line 4—4 on FIG. 1. FIG. 5 is an enlarged detailed sectional view of a portion of the structure shown in FIG. 4. FIG. 6 is a detailed sectional view of a portion of the structure taken as indicated by line 6—6 on FIG. 5, and FIG. 7 is a view similar to FIG. 5 showing a second form of the invention.

The locking mechanism of the present invention can be employed in connection with various machines. For example, it may be used to secure the parts of brake rigging in railroad cars, or it may be used when any two relatively movable parts are to be secured together in engagement with each other. The structure provided is applicable where relatively movable parts are joined as by a bolt or a pin, and particularly when play between the parts is to be eliminated. The present invention is particularly applicable to use in earth handling machines or digging machinery wherein tooth points are releasably secured to adapters so that they are releasable. The machine involved may vary widely in nature, size, and capacity, and it may be, for example, a trenching machine, a shovel, or a scarifier, or any like machinery. In each instance, there will be a tooth or an adapter A that is provided to support and carry a tooth point B. It is the tooth or adapter A and the tooth point B with which the locking mechanism that I have provided is employed.

As clearly illustrated in the drawings, the tooth A and tooth point B are held in pressure locking engagement with each other by a pin C secured in working position by one or more pressure exerting lock units D. In the preferred form of the invention, there are two like units D, one at each side of the structure, and both units act to lock the pin C in working position and both units act to yieldingly urge the pin C into pressure engagement with one of the said relatively moving parts, preferably with the tooth point B.

A tooth A will usually involve, generally, a forwardly projecting shank 10 with a flat front face 11 and a tapered tip 12 projecting forward from the face of the shank. The tooth point B is applied to or over the tip 12, and the pin C releasably secures the point in working position on the tip.

In the preferred form of construction the shank 10 and tip 12 form a rigid unitary element. The tip is forwardly convergent or tapered and in the form illustrated it involves a flat forwardly extending top 15, a flat forwardly extending bottom 16 and flat parallel sides 17. The top 15 and bottom 16 converge and come together or terminate at a forward point 19.

The tooth point B may vary widely in form and construction, it being preferably a unit which is applied to and which encases the tip 12. In the case illustrated the tooth point B involves a top or blade 20 with a forwardly projecting portion having a sharpened edge 21. The blade 20 is arranged over and bears on the top 15 of the tip. Sides or cheeks 22 depend from the edges of the blade 20 and fit over or against the sides 17 of the tip. It is preferred that the sides or cheeks 22 of the tooth point be made the same size and shape as the sides 17 of the tip to be coextensive therewith, as shown throughout the drawings. A bottom 23 joins or extends between the lower edge portions of the cheeks 22 and bears on or fits against the bottom 16 of the tip.

In the preferred construction the tooth point above described is a fabricated element or unit, the bottom and cheeks being formed of a housing, shaped and bent in the desired manner, and the upper edges of the cheeks 22 are permanently or rigidly joined to the blade 20 as by welding or the like. It is to be understood, of course, that the tooth point may be formed as a single cast body of suitable material. In the drawings, welding material is shown at 25 permanently bonding the cheeks 22 to the blade 20. In the particular case illustrated, the rear or inner end of blade 20 abuts the front face 11 of the shank 10 immediately above the tip 12 and a tongue 30 projects from the rear or inner end of the blade 20 and extends into a suitable socket 31 provided in the front face 11 of the shank 10 immediately above the tip.

The pin C provided by the present invention is essentially a simple straight elongate element round in cross section, and to accommodate the pin C, a transverse opening 40 is provided through the tip 12 from one side thereof to the other, and openings 41 are provided in the cheeks 22 of the tooth point and communicate with the opening 40 in the tip when the tooth point is in place on the tip. It is preferred that the bore or opening 40 through the tip be larger than the diameter of the pin or elongated somewhat in cross sectional configuration in a direction longitudinally of the structure, and as shown throughout the drawings, the openings 41 in the cheeks 22 may be likewise enlarged or elongate in cross section. In practice, the opening 41 has a forwardly faced seat or bearing face 42 arcuately formed to have seating engagement with the convex exterior of the pin B, and has clearance in order to easily pass the pin.

The pin C is an elongate element engageable with or applicable to the assembled tooth and tooth point, as shown in FIG. 1 of the drawings, and when in place or in operating position, it extends through both the tooth point and the tip, as shown in FIG. 2 of the drawings. The pin C is made of a simple integral body of material and is characterized by portions X of reduced diameter thus forming stop shoulders for engagement with the pressure exerting lock units D hereinafter described.

The pin C is of substantially uniform cross section throughout its length and has a round outer wall 51 and flat terminal ends 52. When two lock units D are employed, as shown, there are two reduced portions X on the pin C that are turned to be smaller in diameter than the wall 51 which is left at the center portion and extreme end portions of the pin. The said extreme end portions of the pin are placed and are of sufficient extent to have seating engagement with the bearing faces 42 in the cheeks 22 of the tooth point. The reduced or turned portions X have round walls 55 of smaller diameter than the wall 51 and are placed to have bearing engagement with the pressure exerting lock units D.

In accordance with the invention, each reduced portion X is positioned to have an inwardly faced annular shoulder 56 substantially in the plane of the side 17 of the tip 12, and to have an outwardly faced annular shoulder 57 opposed to and spaced inwardly from the shoulder 56. The shoulders 56 and 57 have locking engagement with the pressure exerting lock units D while the walls 55 have pressure engagement with the said units.

The pressure exerting lock units D that I provide are alike and extend longitudinally of the pin C at one side thereof and at the reduced portions X. The units D are carried in recesses 60 that enter the sides 17 of the tip 12 and are positioned forwardly of the transversely extending opening 40 to the end that the pressure exerted by the units is employed to urge the pin C and tooth point B rearwardly onto the tooth A to have tight bearing engagement therewith. As shown, the pressure exerting lock units D each involve a block 70 and means 75 yieldingly urging the block 70 into pressure engagement with the pin C.

The recesses 60 are preferably in the form of drilled holes cut into the sides 17 parallel with the opening 40. The recesses 60 open into the opening 40 at the forward side thereof and have seats 61 opposed to and substantially coextensive with the length of the walls 55 on the pin C. When the recesses are formed as by drilling, the seats are concave and terminate at the bottom of the recesses at a bottom wall 62.

When the recesses 60 are round in configuration, as above described, the pressure exerting lock units D are round in cross section in order to be accommodated in said recesses. As shown, both the block 70 and the means 75 are semicircular in form and of substantially the same curvature as the walls of the recesses 60. The block 70 has an outer rearwardly facing convex face 71 and a flat inner face 72. The curved side walls 63 of the recess restrict the opening into the opening 40 to the end that the block 70 is limited in movement toward the opening 40 and so that only a portion of the block 70 projects into the opening 40.

The means 75 is provided to yieldingly urge the block 70 into pressure engagement with the pin C and is preferably in the form of a single body 76 of rubber or the like confined between the inner face 72 of the block 70 and the seat 61 formed in the tip 12. The body 76 substantially occupies the recess left unoccupied by the block 70 and may in practice be of slightly larger cross section than the remaining portion of the recess in order to be frictionally engaged by initial compression of the unit D. It is important, however, that space be allowed for the means 75 to expand as pressure is applied therto, and for this reason the ends 77 of the body 76 are spaced somewhat from the bottom 62 of the recess and from the plane of the side 17 of the tooth tip 12. Thus, the body 76 is allowed to swell when the block 70 is moved forwardly through engagement with the pin C.

The ends 73 of the block 70 are flat and are chamfered at 78 to provide ease of entry of the pin C. Also, the pin C is chamfered at 80 at the ends 52 thereof in order to cooperate with the chamfered block 70 to the end that the pin C will readily pass by the block 70.

In FIG. 7 of the drawings, I have illustrated a second form of the invention wherein the extreme end portions of the pin C' are of the same diameter as the reduced portion X'. Both ends of the pin C' are alike, and in this form of the invention the wall 55' of the portion X' is continuous with the diameter or wall 56' at the extreme end portion of the pin C'. The seat 42' in the cheek of the tooth point is correspondingly formed to have bearing engagement with the pin C' at said extreme end portion thereof or with the wall 56'. As shown, the end 52' of the pin C' is chamfered at 80' in order to cooperate with the chamfered portion 78 of the block 70 so that the pin C' may be easily driven by a block 70.

From the foregoing, it will be apparent that I have provided an extremely simple and effective mechanism for locking two relatively movable parts together in pressure engagement with each other. In order to assemble the parts, it is merely necessary to insert the pressure exerting locking units D in locking position with the face 71 of the block 70 projecting from the recesses and into the opening 40 to intercept the pin C when it is applied to the opening. The tooth point B is engaged over the tip 12 of the tooth A so that the seats 42 are substantially aligned with the opening 40 that extends transversely through the tip. The pin C is then driven by the seat 42 at one side of the structure and into working position in the opening 40 and so that it engages the seat 42 at the other side of the structure. Entry of the pin C into the opening 40 may be accomplished by hammering, during which operation the blocks 70 of the units D move forwardly against the body 76 of resilient material.

When the pin C is in proper working position, the blocks 70 shift rearwardly into pressure engagement with the faces 55 of the portions X and engage the shoulders 56 and 57 thus securing the pin C against displacement. In the case of the second form of the invention (FIG. 7) the blocks 70 have locking engagement with the outwardly faced shoulders 57'. It is to be observed that the opening 14 is of sufficient extent to allow for shifting of the pin under all normal operating conditions and that the opening 40 is closed to the exterior of the structure by means of the blocks 70 that form closures at each opening 41 in the cheeks 22.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A locking mechanism for yieldingly holding two relatively movable parts in engagement and against separation, including, a solid elongate and round pin engaged through openings in said parts, a reduced rounded portion in the pin and forming a stop shoulder on said pin, and a pressure exerting lock unit carried in a recess in the first part and having means yieldingly urging an element into engagement with the reduced portion of the pin and to engage said stop shoulder, whereby the second part is engaged by the pin to be locked axially against displacement in one direction and held in lateral pressure engagement with the first part.

2. A locking mechanism for yieldingly holding two relatively movable parts in engagement and against separation, including, a solid elongate and round pin engaged through openings in said parts, a reduced rounded portion in the pin and forming spaced opposed stop shoulders, and a pressure exerting lock unit carried in a recess in the first part and having means yieldingly urging an element into engagment with the reduced portion of the pin to engage said stop shoulders, whereby the second part is engaged by the pin to be locked axially against displacement in two directions and held in lateral pressure engagement with the first part.

3. A locking mechanism for yieldingly holding two relatively movable parts in engagement and against separation, including, a solid elongate and round pin engaged through an opening in the first part and with end portions engaged through spaced openings in the second part at the sides of the first part, said pin having spaced stop shoulders, and pressure exerting lock units and one at each side of the first part and carried in recesses in the sides of the first part, said recesses being in open communication with the said opening in the first part, and each lock unit having means yieldingly urging an element into engagement with the pin and to engage said stop shoulders, whereby the second part is engaged by the pin to be locked axially against displacement in two directions and held in lateral pressure engagement with the first part.

4. A locking mechanism for yieldingly holding two relatively movable parts in engagement and against separation, including, a solid elongate and round pin engaged through an opening in the first part and with reduced end portions engaged through spaced openings in the second part at the sides of the first part, said pin having spaced stop shoulders and one at each end portion thereof, and pressure exerting lock units and one at each side of the first part and carried in recesses in the sides of the first part, said recesses being in open communication with the said opening in the first part, and each lock unit having means yieldingly urging an element into engagement with the pin and to engage said stop shoulders, whereby the second part is engaged by the pin to be locked axially against displacement in two directions and held in lateral pressure engagement with the first part.

5. A locking mechanism for yieldingly holding two relatively movable parts in engagement and against separation, including, a solid elongate and round pin engaged through an opening in the first part and with reduced end portions engaged through spaced openings in the second part at the sides of the first part, said pin having spaced outwardly faced stop shoulders and one at each end portion thereof, and pressure exerting lock units and one at each side of the first part and carried in recesses in the sides of the first part, each of said recesses being tapered to open communication with the said opening in the first part, and each lock unit having means yieldingly urging an element into said opening in the first part to engage with the pin and to engage said stop shoulders, said tapered recess restricting movement of said element toward the pin, whereby the second part is engaged by the pin to be locked axially against displacement in two directions and held in lateral pressure engagement with the first part.

6. A locking mechanism for yieldingly holding two relatively movable parts in engagement and against separation, including, a solid elongate and round pin engaged through an opening in the first part and with end portions engaged through spaced openings in the second part at the sides of the first part, said pin having reduced portions at each end portion and each with spaced opposed stop shoulders, and pressure exerting lock units and one at each side of the first part and carried in recesses in the sides of the first part, each of said recesses being tapered to open communication with the said opening in the first part, and each lock unit having means yieldingly urging an element into said opening in the first part to engage with the reduced portions of the pin and to engage the stop shoulders at the end portions thereof, said tapered recess restricting movement of said element toward the pin, whereby the second part is engaged by the pin to be locked axially against displacement in two directions and held in lateral pressure engagement with the first part.

7. A locking mechanism for yieldingly holding two relatively movable parts in engagement and against separation, including, an elongate pin engaged through an opening in one part and with reduced end portions engaged through spaced openings in the other part at the sides of the first mentioned part, said pin having spaced outwardly faced stop shoulders and one at each end portion thereof, and pressure exerting lock units and one at each side of the first mentioned part and occupying recesses in the sides of the first part, each of said recesses being tapered to open communication with the said opening in the first part, and each lock unit having a body of resilient material yieldingly urging a block into said opening in the first part to engage with the pin to engage said stop shoulders, said tapered recess restricting movement of said element toward the pin, whereby the second part is engaged by the pin to be locked axially against displacement in two directions and held in lateral pressure engagement with the first mentioned part.

8. A locking mechanism for yieldingly holding two relatively movable parts in engagement and against separation, including, an elongate pin engaged through an opening in one part and with end portions engaged through spaced openings in the other part at the sides of the first mentioned part, said pin having reduced portions at each end portion and each with spaced opposed stop shoulders, and pressure exerting lock units and one at each side of the first mentioned part and occupying recesses in the sides of the first part, each of said recesses being tapered to open communication with the said opening in the first part, and each lock unit having a body of resilient material yieldingly urging a block into said opening in the first part to engage with one of the reduced portions of the pin to engage the stop shoulders, said tapered recess restricting movement of said element toward the pin, whereby the second part is engaged by the pin to be locked axially against displacement in two directions and held in lateral pressure engagement with the first mentioned part.

(References on following page)

References Cited in the file of this patent

UNITED STATES PATENTS

| | | |
|---|---|---|
| 353,218 | Harrington | Nov. 23, 1886 |
| 407,160 | Brinson | July 16, 1889 |
| 1,096,960 | Derbyshire | May 12, 1914 |
| 1,778,477 | Wood | Oct. 14, 1930 |
| 2,312,802 | Crawford | Mar. 2, 1943 |
| 2,427,651 | Baer | Sept. 23, 1947 |
| 2,429,494 | Stephens | Oct. 21, 1947 |
| 2,483,032 | Baer | Sept. 27, 1949 |
| 2,568,075 | Launder | Sept. 18, 1951 |
| 2,610,416 | Crawford | Sept. 16, 1952 |
| 2,657,482 | Launder et al. | Nov. 3, 1953 |
| 2,702,490 | Launder | Feb. 22, 1955 |

FOREIGN PATENTS

| | | |
|---|---|---|
| 565,417 | Great Britain | Nov. 9, 1944 |
| 972,195 | France | Aug. 23, 1950 |
| 976,239 | France | Oct. 25, 1950 |